(12) United States Patent
Asano et al.

(10) Patent No.: US 12,128,533 B2
(45) Date of Patent: Oct. 29, 2024

(54) COMPONENT ASSEMBLY JIG AND COMPONENT ASSEMBLY METHOD

(71) Applicant: TOYOTA JIDOSHA KABUSHIKI KAISHA, Toyota (JP)

(72) Inventors: Junji Asano, Kariya (JP); Hiroki Watanabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 79 days.

(21) Appl. No.: 18/041,004

(22) PCT Filed: Jul. 7, 2021

(86) PCT No.: PCT/JP2021/025554
§ 371 (c)(1),
(2) Date: Feb. 8, 2023

(87) PCT Pub. No.: WO2022/038912
PCT Pub. Date: Feb. 24, 2022

(65) Prior Publication Data
US 2023/0219202 A1    Jul. 13, 2023

(30) Foreign Application Priority Data

Aug. 21, 2020   (JP) ................................ 2020-139783

(51) Int. Cl.
*B25B 23/02*     (2006.01)
*B23P 19/06*     (2006.01)

(52) U.S. Cl.
CPC .............. *B25B 23/02* (2013.01); *B23P 19/06* (2013.01)

(58) Field of Classification Search
CPC ......... B25B 23/08; B25B 23/02; B23P 19/06; B23P 19/10
See application file for complete search history.

(56) References Cited

FOREIGN PATENT DOCUMENTS

| JP | 11198055 A | * | 7/1999 |
| JP | 2008-73835 A | | 4/2008 |
| JP | 5578904 B2 | * | 8/2014 |

OTHER PUBLICATIONS

Suzuki Toshiaki; JPH11198055A Guide Jig for Fastening Screw; EPO English Machine Translation; pp. 1-4 (Year: 1999).*
International Search Report issued Sep. 14, 2021 in PCT/JP2021/025554 filed on Jul. 7, 2021, 2 pages.

* cited by examiner

*Primary Examiner* — Bayan Salone
(74) *Attorney, Agent, or Firm* — Oblon, McClelland, Maier & Neustadt, L.L.P.

(57) ABSTRACT

A component assembly jig is a jig for assembling an assembly component to a target component using a plurality of bolts. The component assembly jig includes a jig body that temporarily holds the assembly component, and a plurality of positioning guides that position a plurality of bolt through-holes of the assembly component in a plurality of screw holes of a target component. According to the above configuration, the plurality of bolt through-holes can be positioned in the plurality of screw holes using the plurality of positioning guides. Thus, the assembly component can be easily assembled to the target component with the plurality of bolts regardless of whether the working environment is good or bad.

5 Claims, 11 Drawing Sheets

COMPONENT ASSEMBLY JIG AND COMPONENT ASSEMBLY METHOD

TECHNICAL FIELD

The present invention relates to a component assembly jig and a component assembly method.

BACKGROUND ART

Patent Literature 1 discloses a bolt insertion jig used for collectively inserting bolts into a plurality of bolt fastening holes of a bolt fastening target object. The bolt insertion jig includes a plurality of bolt guides positionally fixed to the plurality of bolt fastening holes, and a plurality of pipes that elastically deform the plurality of bolt guides to release the bolts held by the plurality of bolt guides.

CITATION LIST

Patent Literature

Patent Literature 1: Japanese Unexamined Patent Application Publication No. 2008-73835

SUMMARY OF INVENTION

Technical Problem

At the time of assembling an assembly component to the target component with a bolt, a good working environment may not be secured because the target component cannot be directly visually recognized or a worker's both hands cannot be used, for example. In such a case, it is difficult to assemble the assembly component to the target component with a bolt.

An object of the present invention is to provide a technique for easily assembling an assembly component to a target component with a plurality of bolts regardless of whether a working environment is good or bad.

Solution to Problem

According to a first aspect of the present invention, there is provided a component assembly jig for assembling an assembly component to a target component using a plurality of bolts, the component assembly jig including: a jig body that temporarily holds the assembly component; and at least one positioning guide that positions a plurality of bolt through-holes in the assembly component to a plurality of screw holes in the target component. According to the above configuration, since the plurality of bolt through-holes can be positioned in the plurality of screw holes using the at least one positioning guide, the assembly component can be easily assembled to the target component with the plurality of bolts regardless of whether a working environment is good or bad.

Preferably, the jig body has a plurality of tool insertion holes corresponding to the plurality of bolt through-holes. According to the above configuration, the assembly component can be assembled to the target component using the plurality of bolts while the jig body temporarily holds the assembly component.

Preferably, the jig body has a tool guide groove extending so as to connect any two of openings of the plurality of tool insertion holes. According to the above configuration, the tool can be easily moved from one to the other of any two of the openings of the plurality of tool insertion holes.

Preferably, the jig body has a tool guide groove annularly extending so as to connect openings of the plurality of tool insertion holes to each other. According to the above configuration, the tool can be easily moved between the openings of the plurality of tool insertion holes.

Preferably, the tool guide groove is formed in a seamless manner. According to the above configuration, the traveling direction of the tool is not limited when the tool is moved between the openings of the plurality of tool insertion holes.

Preferably, in a state where the jig body temporarily holds the assembly component, there is formed a plurality of head part housing spaces that respectively houses head parts of the plurality of bolts inserted into the plurality of bolt through-holes in the assembly component between the assembly component and the jig body, the jig body has jig-side bolt facing surfaces that face the head parts of the bolts housed in the head part housing spaces in a bolt insertion direction to restrict movement of the head parts in the bolt insertion direction, the assembly component has component-side bolt facing surfaces that face the head parts of the bolts housed in the head part housing spaces in the bolt insertion direction to restrict the movement of the head parts in the bolt insertion direction, and a distance between each jig-side bolt facing surface and the corresponding component-side bolt facing surface is longer than a dimension of the corresponding head part in the bolt insertion direction. According to the above configuration, the assembly component can be temporarily held by the jig body in a state where the plurality of bolts are inserted in advance into the plurality of bolt through-holes in the assembly component.

Preferably, the at least one positioning guide includes a plurality of positioning guides, and each positioning guide has a guide surface contactable with an outer peripheral surface of a cylindrical part of the target component in which a corresponding screw hole is formed.

According to a second aspect of the present invention, there is provided a component assembly method for assembling an assembly component to a target component using a plurality of bolts, the component assembly method including: temporarily holding the assembly component by a jig body of a component assembly jig, the component assembly jig including the jig body that temporarily holds the assembly component and at least one positioning guide that positions a plurality of bolt through-holes in the assembly component to a plurality of screw holes in the target component; and positioning a plurality of bolt through-holes in the assembly component to a plurality of screw holes in the target component using the at least one positioning guide. According to the above method, since the plurality of bolt through-holes can be positioned to the plurality of screw holes using the at least one positioning guide, the assembly component can be easily assembled to the target component with the plurality of bolts regardless of whether a working environment is good or bad.

Preferably, after the plurality of bolts are inserted into the plurality of bolt through-holes in the assembly component, the assembly component is temporarily held by the jig body. According to the above method, the plurality of bolts can be inserted into the plurality of bolt through-holes in the assembly component before the plurality of bolt through-holes in the assembly component are positioned to the plurality of screw holes in the target component using the at least one positioning guide.

Preferably, the plurality of bolts are fastened to the plurality of screw holes in the target component while the assembly component is temporarily held by the jig body.

Advantageous Effects of Invention

According to the present invention, there is provided a technique for easily assembling an assembly component to a target component with a plurality of bolts regardless of whether a working environment is good or bad.

DESCRIPTION OF EMBODIMENTS

Figure 1:
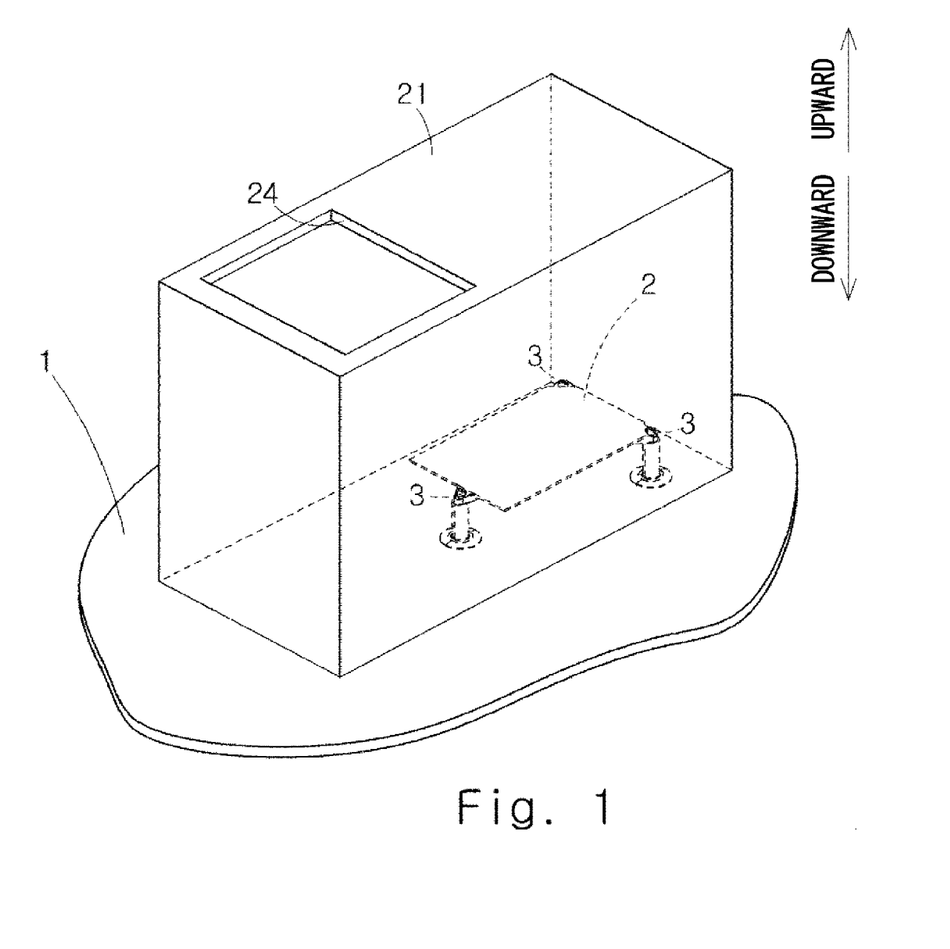
FIG. 1 is a perspective view of a state in which an assembly component is assembled to a target component.
Figure 2:
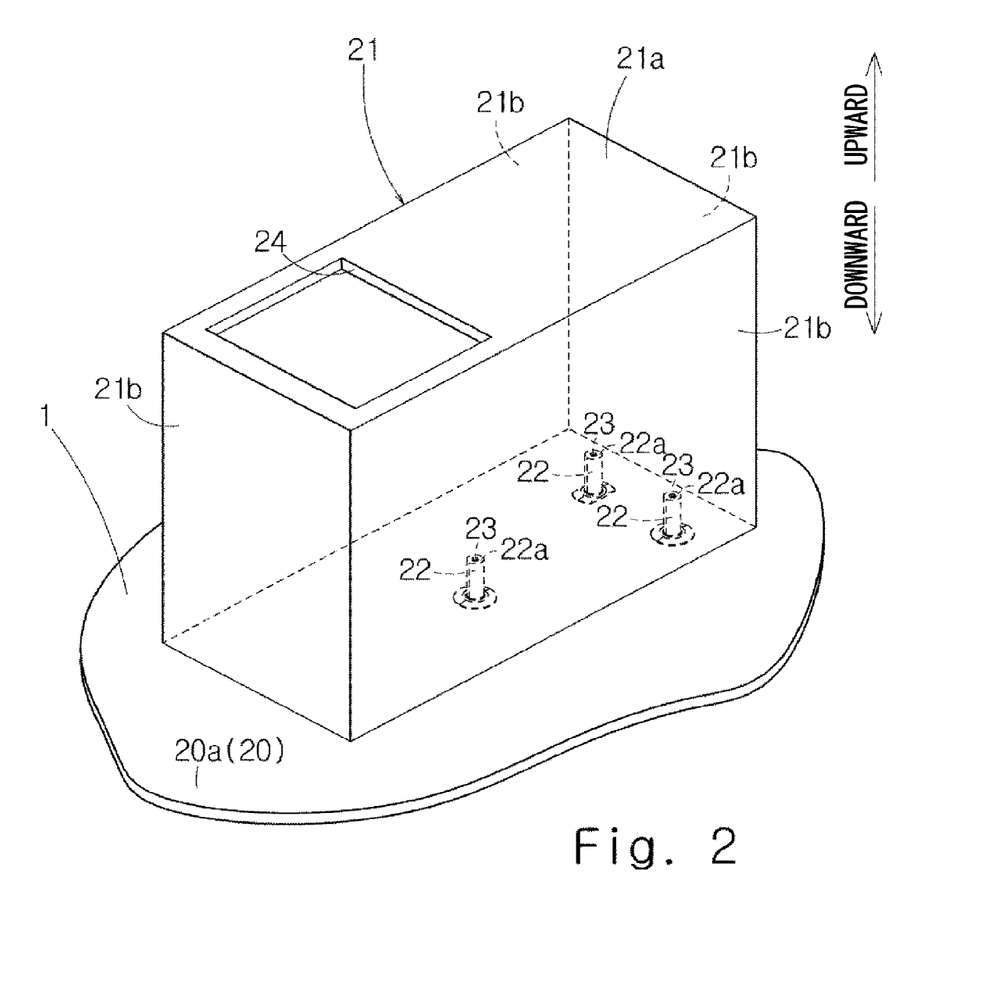
FIG. 2 is a perspective view of a target component.
Figure 3:
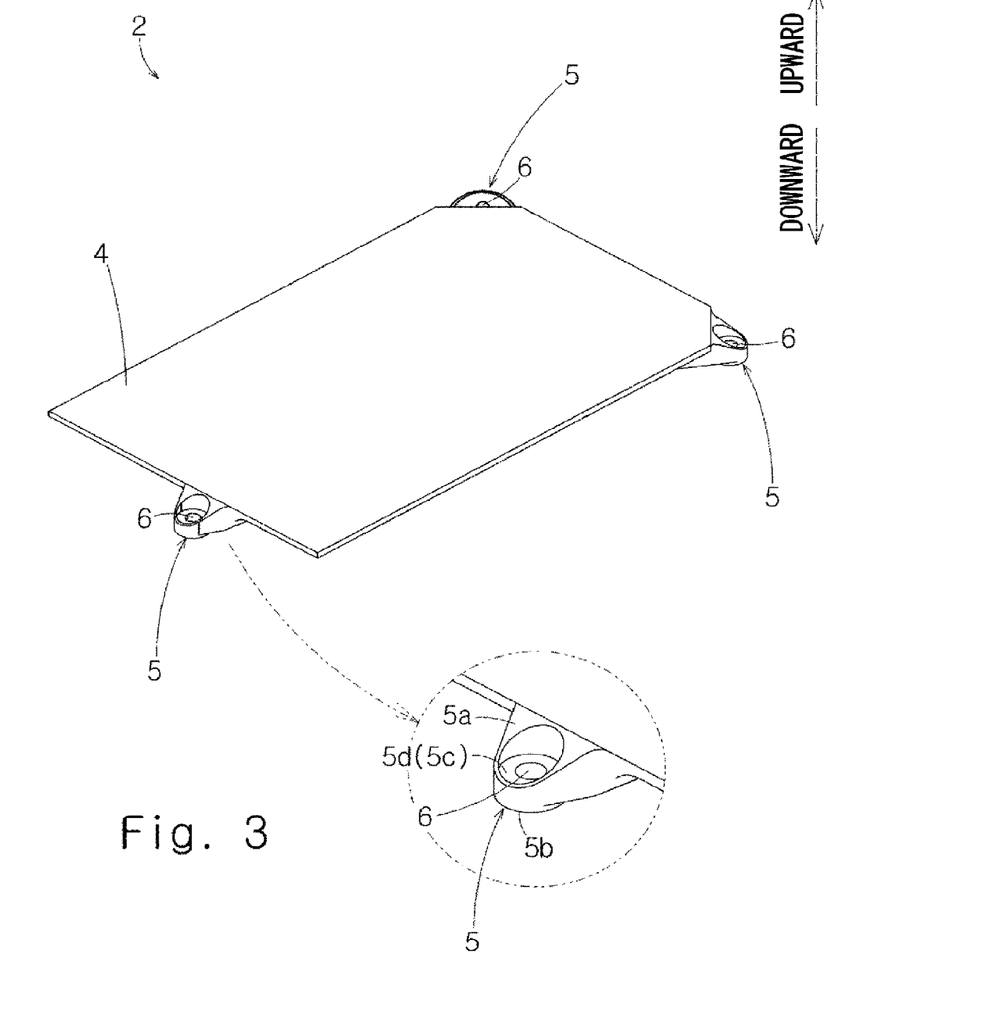
FIG. 3 is a perspective view of an assembly component.

Hereinafter, an embodiment of the present invention will be described with reference to the drawings. FIG. 1 illustrates a state in which an assembly component 2 is assembled to a target component 1 using a plurality of bolts 3. FIG. 2 illustrates only the target component 1. FIG. 3 is a perspective view of the assembly component 2.

As illustrated in FIG. 3, the assembly component 2 is typically an electronic device. The assembly component 2 includes an assembly component body 4 having a substantially flat plate shape and three fixing protrusions 5 protruding outward from the assembly component body 4. The assembly component body 4 is formed by storing an electronic substrate in a housing made of metal such as duralumin, for example. The three fixing protrusions 5 are formed integrally with the housing of the assembly component body 4. Each fixing protrusion 5 has an upper surface 5a and a lower surface 5b. The upper surface 5a is a tapered surface. Each fixing protrusion 5 has a bolt through-hole 6. Each bolt through-hole 6 is formed so as to open to the upper surface 5a and the lower surface 5b of the corresponding fixing protrusion 5. The upper surface 5a has a component-side head part housing recess 5c. Each fixing protrusion 5 has a component-side bolt facing surface 5d that partitions the component-side head part housing recess 5c in the vertical direction. The three bolt through-holes 6 are formed such that central axes thereof are parallel to each other. The three bolt through-holes 6 extend in parallel with the plate thickness direction of the assembly component body 4.

Referring to FIG. 2, the target component 1 includes a target component body 20 having a thin plate shape, a housing box 21 that is provided in the target component body 20 to house the assembly component 2, and three columnar assembly pedestals 22.

The three assembly pedestals 22 are arranged in an internal space of the housing box 21. The three assembly pedestals 22 are formed so as to protrude from the target component body 20. The three assembly pedestals 22 protrude parallel to the plate thickness direction of the target component body 20. Hereinafter, the direction in which the assembly pedestals 22 protrude from the target component body 20 will be defined as "upward", and the opposite direction will be defined as "downward". The "vertical direction" will be defined as a direction including "upward" and "downward". Therefore, the three assembly pedestals 22 are formed so as to protrude upward from an upper surface 20a of the target component body 20. An upper surface 22a of each assembly pedestal 22 has a screw hole 23.

The housing box 21 includes a top plate 21a and four side plates 21b. The top plate 21a faces the upper surface 20a of the target component body 20 in the vertical direction. The top plate 21a has a service hole 24. The service hole 24 is a path of the assembly component 2 in assembling the assembly component 2 to the three assembly pedestals 22 arranged inside the housing box 21. As illustrated in FIG. 1, the service hole 24 is not formed directly above the assembly component 2 assembled to the target component 1, and the service hole 24 is not formed large enough to put both hands at the same time.

Therefore, the working environment is not good at the time of assembling the assembly component 2 to the target component 1 with the plurality of bolts 3 because the target component 1 cannot be directly visually recognized, and the internal space of the housing box 21 is dark and cannot be treated with both hands. This makes it difficult to assemble the assembly component 2 to the target component 1 with the plurality of bolts 3.

Figure 4:
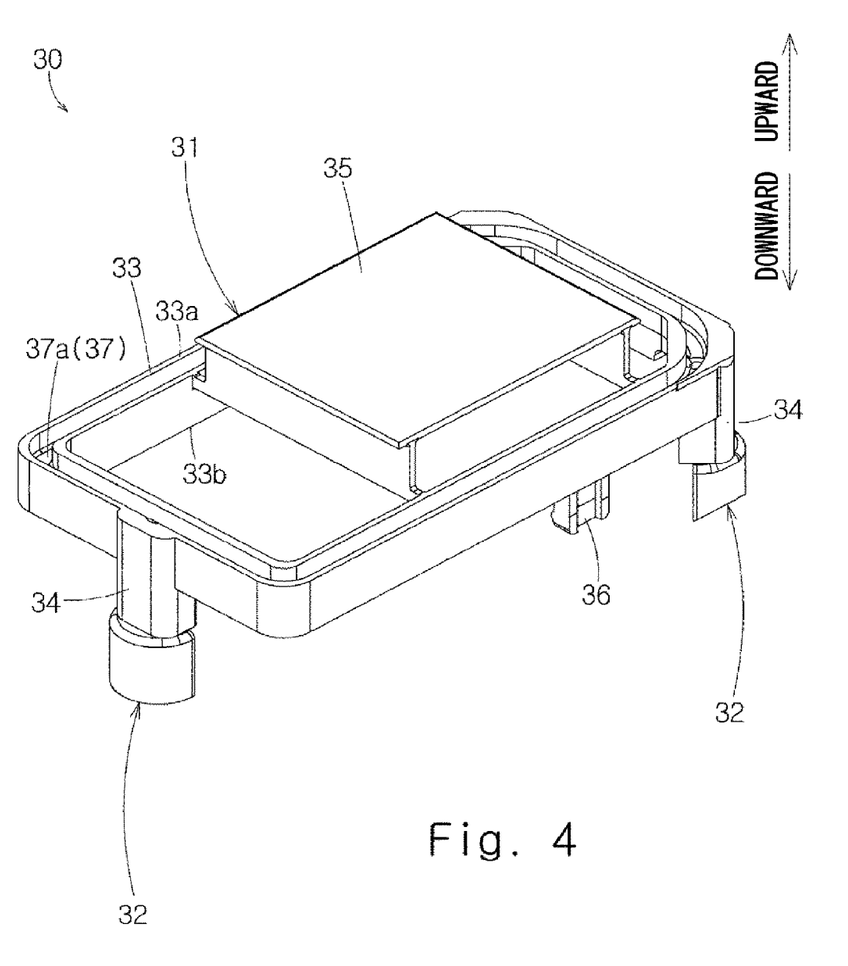
FIG. 4 is a perspective view of a component assembly jig.
Figure 5:
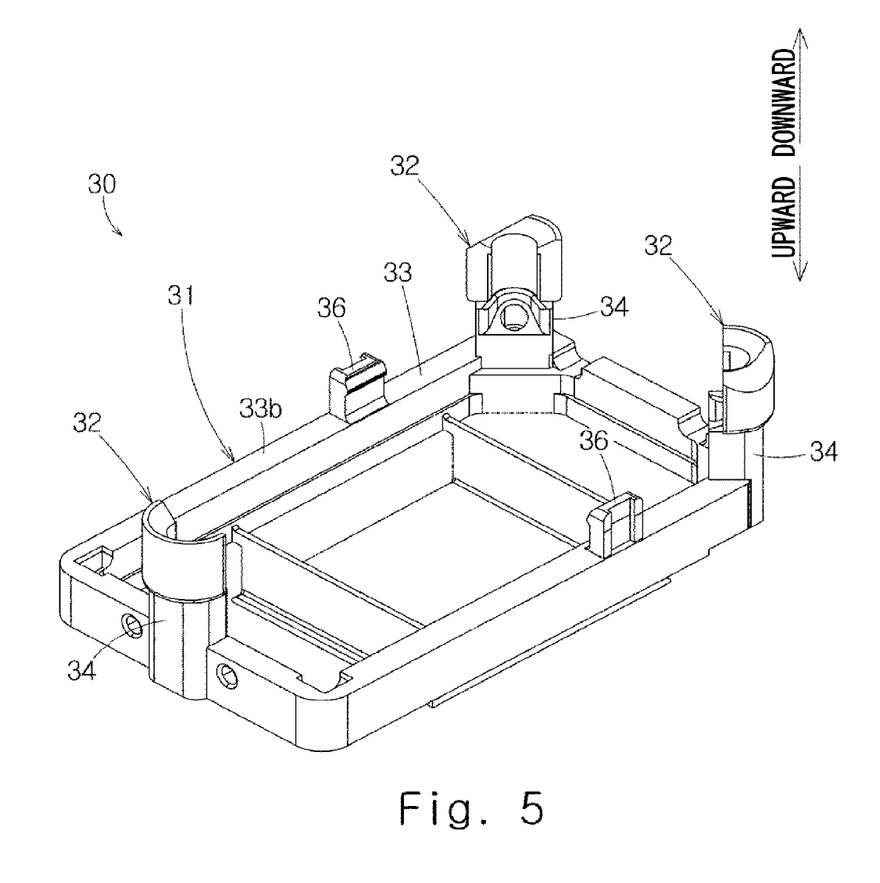
FIG. 5 is a perspective view of the component assembly jig as seen from another angle.
Figure 6:
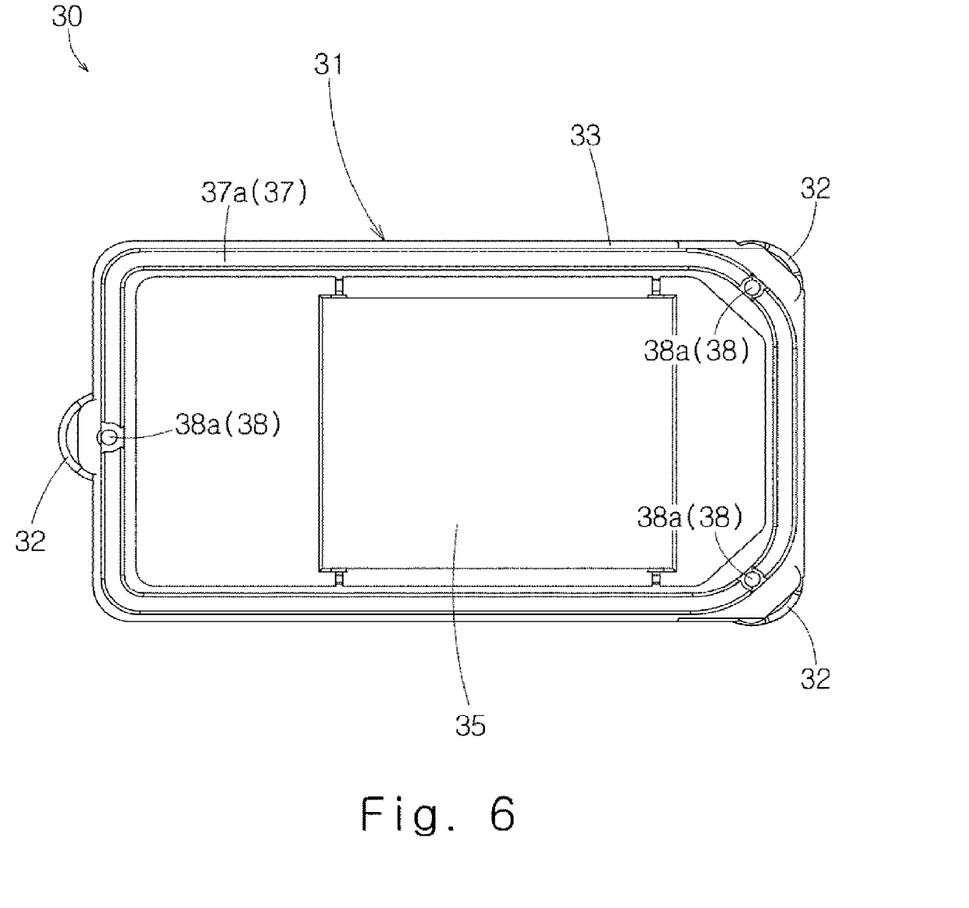
FIG. 6 is a plan view of the component assembly jig.

Therefore, in the present embodiment, the assembly component 2 is assembled to the target component 1 using a component assembly jig 30 illustrated in FIGS. 4 to 6. FIGS. 4 and 5 are perspective views of the component assembly jig 30. FIG. 6 is a plan view of the component assembly jig 30.

The relative posture of the component assembly jig 30 to the target component 1 at the time of assembling the assembly component 2 to the target component 1 using the component assembly jig 30 is unique. Therefore, the terms "upward", "downward", and "vertical direction" defined based on the structure of the target component 1 in FIG. 2 will be used as they are in the following description of the component assembly jig 30.

However, the terms "upward", "downward", and "vertical direction" are used for convenience of description, and should not be interpreted as limiting the postures of the target component 1, the assembly component 2, and the component assembly jig 30 during actual use.

Referring to FIGS. 4 and 5, the component assembly jig 30 is made of an insulating resin, for example, and includes a jig body 31 that temporarily holds the assembly component 2 and three positioning guides 32 that position the plurality of bolt through-holes 6 of the assembly component 2 in the plurality of screw holes 23 of the target component 1.

The jig body 31 includes a ring part 33 extending annularly in a seamless manner, three leg parts 34 protruding downward from the ring part 33, a protective plate 35, and two elastic holding pieces 36.

The ring part 33 extends in a rectangular shape. The ring part 33 has an upper surface 33a and a lower surface 33b. The upper surface 33a has a tool guide groove 37. The tool guide groove 37 is annularly formed in a seamless manner along the ring part 33. The tool guide groove 37 has a groove bottom surface 37a.

Figure 7:
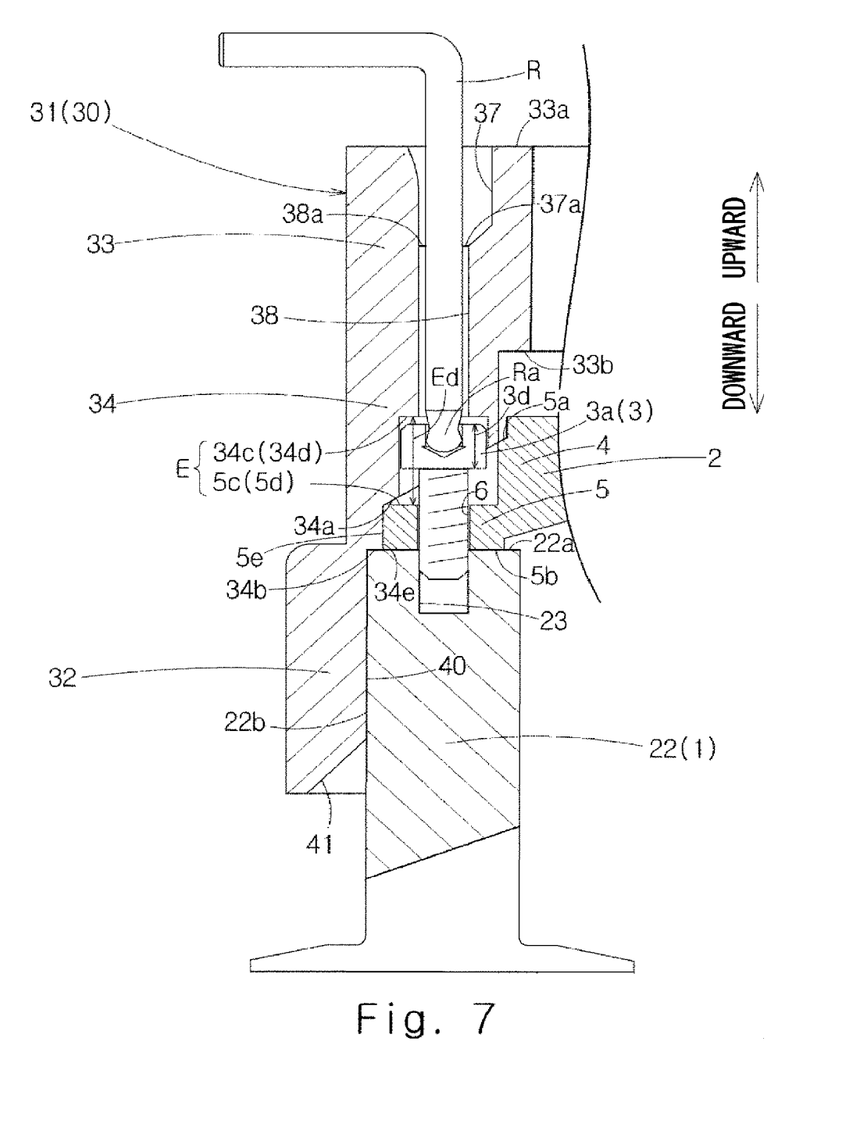
FIG. 7 is a cross-sectional view of a state of screw fastening.

Each leg part 34 protrudes downward from the lower surface 33b of the ring part 33. Reference is now made also to FIG. 7. FIG. 7 illustrates a state in which the assembly component 2 is assembled to the target component 1 using the component assembly jig 30 in a cross-sectional view. As illustrated in FIG. 7, each leg part 34 has a tapered surface 34a that faces the upper surface 5a of the corresponding fixing protrusion 5 in the assembly component 2 in a state where the jig body 31 temporarily holds the assembly component 2, and a reference surface 34b that comes into surface contact with the upper surface 22a of the assembly pedestal 22 at the time of assembling the assembly component 2 to the target component 1. The tapered surface 34a has a jig-side head part housing recess 34c. Each leg part 34 has a jig-side bolt facing surface 34d that partitions the jig-side head part housing recess 34c in the vertical direction. In a state where the jig body 31 temporarily holds the assembly component 2, the component-side head part housing recess 5c of each fixing protrusion 5 and the jig-side head part housing recess 34c of the corresponding leg part 34 constitute a head part housing space E that houses the head part 3a of the corresponding bolt 3. The dimension of the head part housing space E in the vertical direction, that is, a distance Ed in the vertical direction between the jig-side bolt facing surface 34d and the component-side bolt facing surface 5d is larger than a dimension 3d of the head part 3a of the bolt 3 in the vertical direction. Therefore, each bolt 3 is movable within a predetermined range in the vertical direction with respect to the target component 1, the assembly component 2, and the component assembly jig 30 in a state where the head part 3a of the bolt 3 is housed in the head part housing space E. In the present embodiment, the head part 3a of each bolt 3 is a head part with a hexagonal hole, but the present invention is not limited thereto.

As illustrated in FIG. 7, each leg part 34 has a tool insertion hole 38. Each tool insertion hole 38 is formed along the vertical direction so as to open to the jig-side bolt facing surface 34d of the jig-side head part housing recess 34c of the corresponding leg part 34 and the upper surface 33a of the ring part 33. In other words, each tool insertion hole 38 opens to the jig-side bolt facing surface 34d of the jig-side head part housing recess 34c of the corresponding leg part 34 and the groove bottom surface 37a of the tool guide groove 37 formed on the upper surface 33a of the ring part 33. As illustrated in FIG. 6, the annular tool guide groove 37 extends annularly in a seamless manner so as to connect to openings 38a of the three tool insertion holes 38. Therefore, as illustrated in FIG. 7, after a hexagonal wrench R is inserted into one tool insertion hole 38 and the corresponding bolt 3 is fastened to the screw hole 23 of the assembly pedestal 22, the hexagonal wrench R is pulled out from the tool insertion hole 38, and a leading end Ra of the hexagonal wrench R is slid on the groove bottom surface 37a of the tool guide groove 37, so that the leading end Ra of the hexagonal wrench R can be moved to another tool insertion hole 38 without requiring visual observation. The hexagonal wrench R is a specific example of the tool.

As illustrated in FIG. 7, each positioning guide 32 is formed to protrude downward from the reference surface 34b of the corresponding leg part 34. Each positioning guide 32 has a curved guide surface 40 that can come into contact with an outer peripheral surface 22b of the corresponding assembly pedestal 22, and a tapered surface 41 for guiding the corresponding assembly pedestal 22 to the guide surface 40. When the guide surface 40 of each positioning guide 32 faces the outer peripheral surface 22b of the corresponding assembly pedestal 22, the corresponding bolt through-hole 6 is positioned with respect to the screw hole 23 of the corresponding assembly pedestal 22.

Returning to FIG. 4, at the time of assembly of the assembly component 2 to the target component 1, the protective plate 35 covers the assembly component 2 illustrated in FIG. 3 to make it difficult to touch the assembly component 2, thereby preventing the assembly component 2 from falling off from the component assembly jig 30. The protective plate 35 can be omitted.

As illustrated in FIGS. 4 and 5, the two elastic holding pieces 36 protrude downward from the lower surface 33b of the ring part 33. Since the assembly component 2 is inserted between the two elastic holding pieces 36, the two elastic holding pieces 36 of the jig body 31 detachably hold the assembly component 2. In other words, since the assembly component 2 is inserted between the two elastic holding pieces 36, the two elastic holding pieces 36 of the jig body 31 temporarily hold the assembly component 2.

The positioning between the assembly component 2 and the component assembly jig 30 in the direction orthogonal to the vertical direction is realized by surface contact between the outer surface 5e of each fixing protrusion 5 and the inner surface 34e of each leg part 34 illustrated in FIG. 7, for example.

Figure 8:
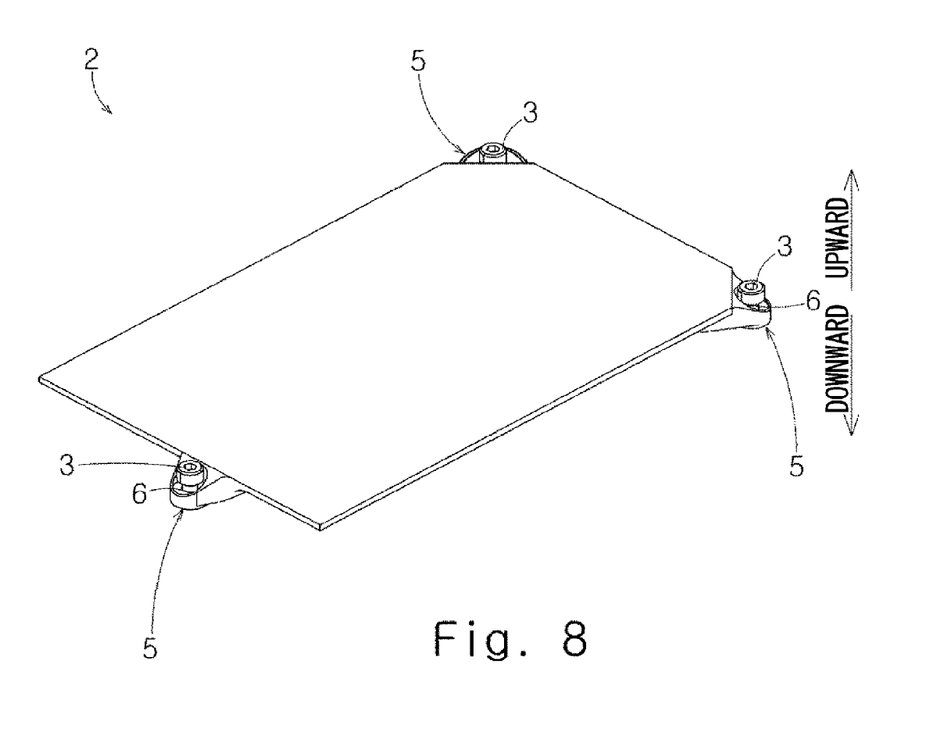
FIG. 8 is a perspective view of a state in which a plurality of bolts are set to the assembly component.
Figure 9:
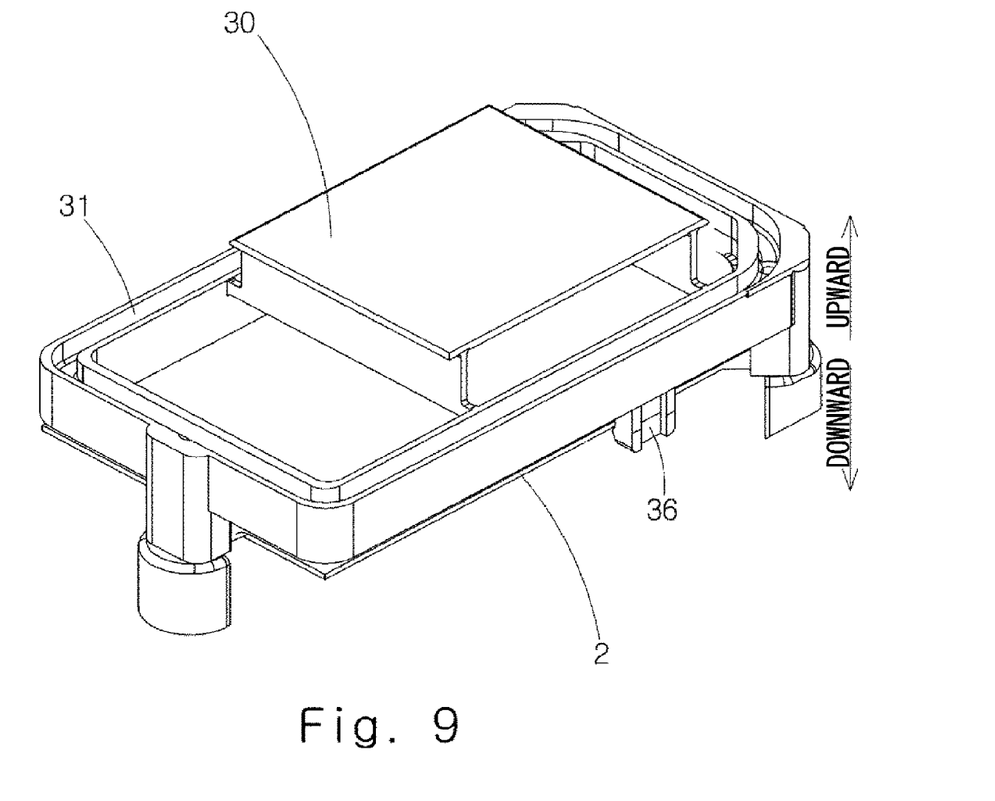
FIG. 9 is a perspective view of a state in which the assembly component is temporarily held by the component assembly jig.
Figure 10:
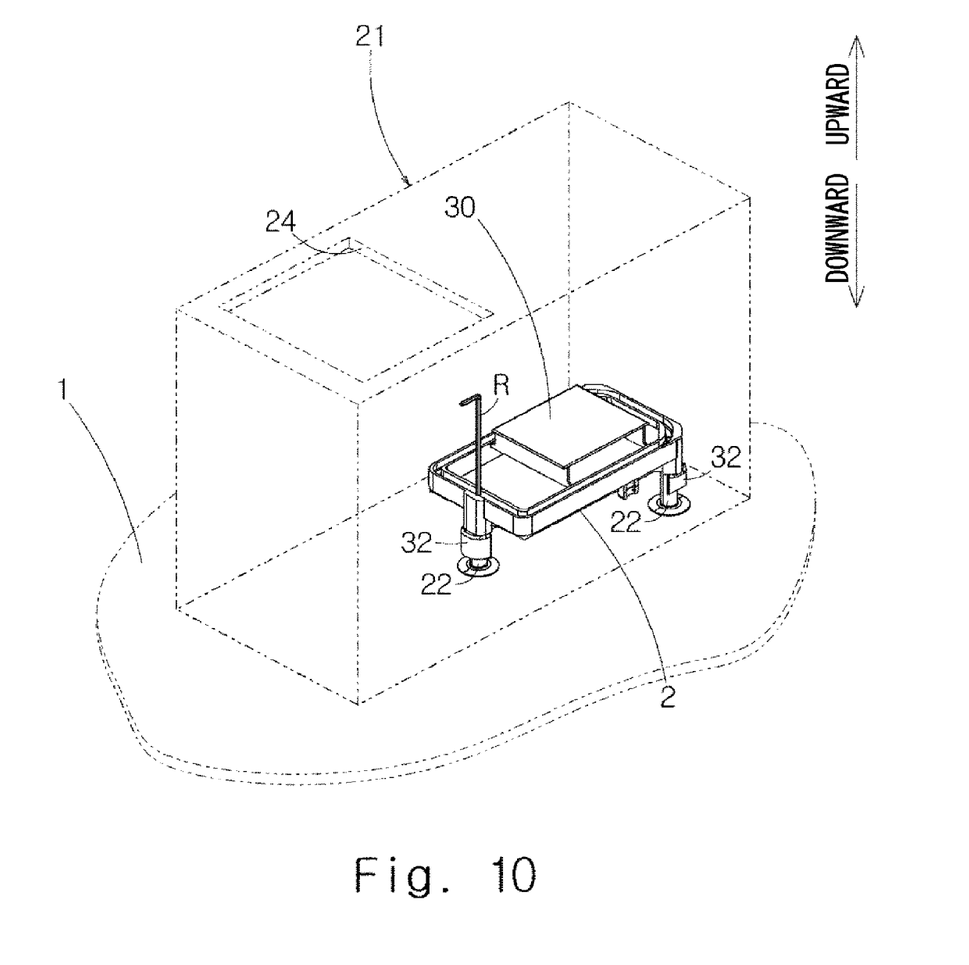
FIG. 10 is a perspective view of a state in which the assembly component is assembled to the target component using the component assembly jig.
Figure 11:
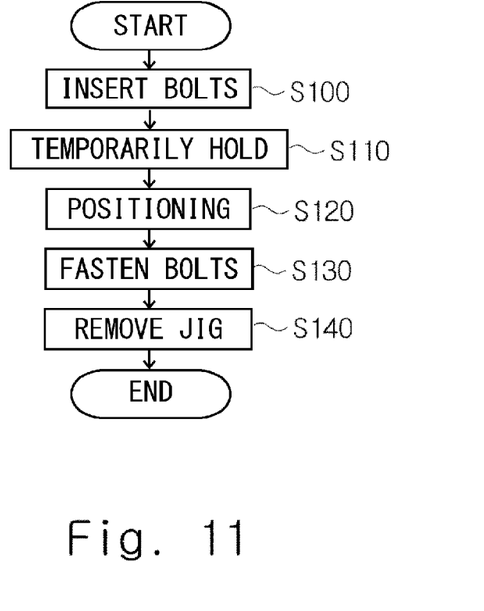
FIG. 11 is a flowchart of a component assembly method.

Next, a component assembly method by which to assemble the assembly component 2 to the target component 1 using the plurality of bolts 3 will be described with reference to FIGS. 8 to 11. FIG. 8 illustrates a state in which the plurality of bolts 3 are attached to the assembly component 2. FIG. 9 illustrates a state in which the assembly component 2 is temporarily held by the component assembly jig 30. FIG. 10 illustrates a state in which the assembly component 2 is assembled to the target component 1 while the assembly component 2 is temporarily held by the component assembly jig 30. FIG. 11 illustrates a flow of the component assembly method.

As illustrated in FIG. 11, the component assembly method includes a bolt inserting step (S100), a temporary holding step (S110), a positioning step (S120), a bolt fastening step (S130), and a jig detaching step (S140). The component assembly method includes at least the temporary holding step (S110) and the positioning step (S120).

<Bolt Inserting Step: S100>

First, as illustrated in FIG. 8, the bolts 3 are inserted into the bolt through-holes 6 in the fixing protrusions 5 of the assembly component 2.

<Temporary Holding Step: S110>

Next, as illustrated in FIG. 9, the assembly component 2 is temporarily held by the jig body 31 of the component assembly jig 30. As a result, as illustrated in FIG. 7, the head parts 3a of the bolts 3 inserted into the bolt through-holes 6 in the fixing protrusions 5 of the assembly component 2 are housed in the head part housing spaces E. Even if the posture of the assembly component 2 is upside down, the bolts 3 do not fall off from the bolt through-holes 6 in the fixing protrusions 5.

<Positioning Step: S120>

Next, as illustrated in FIG. 10, the assembly component 2 is mounted on the plurality of assembly pedestals 22 of the target component 1 while the assembly component 2 is temporarily held by the component assembly jig 30. Specifically, the plurality of bolt through-holes 6 of the assembly component 2 are positioned in the screw holes 23 in the plurality of assembly pedestals 22 of the target component 1.

<Bolt Fastening Step: S130>

Next, the bolt 3 previously inserted into the bolt through-hole 6 in each fixing protrusions 5 of the assembly component 2 is fastened to the screw hole 23 in the corresponding assembly pedestal 22 using the hexagonal wrench R. As a result, the assembly component 2 is assembled to the target component 1 using the plurality of bolts 3.

<Jig Detaching Step: S140>

Finally, the component assembly jig 30 is detached from the assembly component 2, and the component assembly jig 30 is collected from the service hole 24 of the housing box 21. Thus, the assembly of the assembly component 2 to the target component 1 is completed.

As above, the embodiment of the present invention has been described. The above embodiment has the following features.

As illustrated in FIGS. 8 to 10, the component assembly jig 30 is a jig for assembling the assembly component 2 to the target component 1 using the plurality of bolts 3. The component assembly jig 30 includes a jig body 31 that temporarily holds the assembly component 2 and a plurality of positioning guides 32 that position the plurality of bolt through-holes 6 of the assembly component 2 in the plurality of screw holes 23 of the target component 1. According to the above configuration, since the plurality of bolt through-holes 6 can be positioned in the plurality of screw holes 23 using the plurality of positioning guides 32, the assembly component 2 can be easily assembled to the target component 1 with the plurality of bolts 3 regardless of whether the working environment is good or bad.

The component assembly jig 30 includes at least one positioning guide 32. Therefore, the component assembly jig 30 may include a plurality of positioning guides 32 as in the present embodiment, or may include only one positioning guide 32.

As illustrated in FIG. 7, the jig body 31 has a plurality of tool insertion holes 38 corresponding to the plurality of bolt through-holes 6. According to the above configuration, the assembly component 2 can be assembled to the target component 1 using the plurality of bolts 3 while the jig body 31 temporarily holds the assembly component 2.

As illustrated in FIGS. 4, 6, and 7, the jig body 31 has the tool guide groove 37 extending so as to connect any two of the openings 38a of the plurality of tool insertion holes 38. According to the above configuration, the hexagonal wrench R can be easily moved from one to the other of any two of the openings 38a of the plurality of tool insertion holes 38.

As illustrated in FIG. 6, the jig body 31 has the tool guide groove 37 extending annularly so as to connect the openings 38a of the plurality of tool insertion holes 38 to each other. According to the above configuration, the hexagonal wrench R can be easily moved between the openings 38a of the plurality of tool insertion holes 38.

As illustrated in FIG. 6, the tool guide groove 37 is formed in a seamless manner. According to the above configuration, the traveling direction of the hexagonal wrench R is not limited when the tool is moved between the openings 38a of the plurality of tool insertion holes 38.

As illustrated in FIG. 7, in a state where the jig body 31 temporarily holds the assembly component 2, the plurality of head part housing spaces E for housing the head parts 3a of the plurality of bolts 3 inserted into the plurality of bolt through-holes 6 of the assembly component 2 are formed between the assembly component 2 and the jig body 31. The jig body 31 has jig-side bolt facing surfaces 34d that face the head parts 3a of the bolts 3 housed in the head part housing spaces E in the vertical direction as the bolt insertion direction, thereby to restrict the movement of the head parts 3a in the vertical direction. Similarly, the assembly component 2 has the component-side bolt facing surface 5d that faces the head parts 3a of the bolts 3 housed in the head part housing spaces E in the vertical direction, thereby to restrict the movement of the head parts 3a in the vertical direction. The distance between each jig-side bolt facing surface 34d and the corresponding component-side bolt facing surface 5d is larger than the dimension 3d of the corresponding head part 3a in the vertical direction. According to the above configuration, the assembly component 2 can be temporarily held by the jig body 31 in a state where the plurality of bolts 3 are inserted in advance into the plurality of bolt through-holes 6 in the assembly component 2.

The component assembly jig 30 includes a plurality of positioning guides 32. Each positioning guide 32 has a guide surface 40 that can come into contact with the outer peripheral surface 22b of the assembly pedestal 22 as the cylindrical part of the target component 1 in which the corresponding screw hole 23 is formed. According to the above configuration, the plurality of bolt through-holes 6 can be positioned in the plurality of screw holes 23 using the plurality of positioning guides 32 with a simple configuration.

As illustrated in FIG. 11, the component assembly method for assembling the assembly component 2 to the target component 1 using the plurality of bolts 3 includes: temporarily holding the assembly component 2 in the jig body 31 of the component assembly jig 30 (S110); and positioning the plurality of bolt through-holes 6 of the assembly component 2 in the plurality of screw holes 23 of the target component 1 using the plurality of positioning guides 32 (S120). According to the above method, since the plurality of bolt through-holes 6 can be positioned in the plurality of screw holes 23 using the plurality of positioning guides 32, the assembly component 2 can be easily assembled to the target component 1 with the plurality of bolts 3 regardless of whether the working environment is good or bad.

The component assembly method also includes: inserting the plurality of bolts 3 into the plurality of bolt through-holes 6 in the assembly component 2 (S100); and temporarily holding the assembly component 2 by the jig body 31 (S110). According to the above method, the plurality of bolts 3 can be inserted into the plurality of bolt through-holes 6 in the assembly component 2 before the plurality of bolt through-holes 6 in the assembly component 2 are positioned in the plurality of screw holes 23 in the target component 1 using the plurality of positioning guides 32.

The component assembly method also includes, as illustrated in FIG. 10, fastening the plurality of bolts 3 to the plurality of screw holes 23 in the target component 1 while the assembly component 2 is temporarily held by the jig body 31 (S130).

Although the preferred embodiment of the present invention has been described above, the above embodiment can be modified as follows.

The housing box 21 is illustrated in FIG. 1 in order to exemplify that the working environment for assembling the assembly component 2 to the target component 1 may not be good, and the present invention should not be limited by the housing box 21 or the service hole 24.

In the present embodiment, the assembly component 2 is assembled to the plurality of assembly pedestals 22 of the target component 1. Alternatively, the assembly component 2 may be assembled to the target component body 20 of the target component 1. In this case, it is preferable to provide protrusions or recesses in the vicinities of the screw holes 23 formed in the target component 1 so that the plurality of positioning guides 32 of the component assembly jig 30 can perform a positioning function.

The present application claims priority based on Japanese Patent Application No. 2020-139783 filed on Aug. 21, 2020, the entire disclosure of which is incorporated herein.

REFERENCE SIGNS LIST

1 TARGET COMPONENT
2 ASSEMBLY COMPONENT
3 BOLT
3a HEAD PART
3d DIMENSION
4 ASSEMBLY COMPONENT BODY
5 FIXING PROTRUSION
5a UPPER SURFACE
5b LOWER SURFACE
5c COMPONENT-SIDE HEAD PART HOUSING RECESS
5d COMPONENT-SIDE BOLT FACING SURFACE
6 BOLT THROUGH-HOLE
20 TARGET COMPONENT BODY
20a UPPER SURFACE
21 HOUSING BOX
21a TOP PLATE
21b SIDE PLATE
22 ASSEMBLY PEDESTAL
22a UPPER SURFACE
22b OUTER PERIPHERAL SURFACE
23 SCREW HOLE
24 SERVICE HOLE
30 COMPONENT ASSEMBLY JIG
31 JIG BODY
32 POSITIONING GUIDE
33 RING PART
33a UPPER SURFACE
33b LOWER SURFACE
34 LEG PART
34a TAPERED SURFACE
34b REFERENCE SURFACE
34c JIG-SIDE HEAD PART HOUSING RECESS
34d JIG-SIDE BOLT FACING SURFACE
34e INNER SURFACE
35 PROTECTIVE PLATE
36 ELASTIC HOLDING PIECE
37 TOOL GUIDE GROOVE
37a GROOVE BOTTOM SURFACE
38 TOOL INSERTION HOLE
38a OPENING
40 GUIDE SURFACE
41 TAPERED SURFACE
E HEAD PART HOUSING SPACE
Ed DISTANCE
R HEXAGONAL WRENCH
Ra LEADING END

The invention claimed is:

1. A component assembly jig for assembling an assembly component to a target component using a plurality of bolts, the component assembly jig comprising:
a jig body configured to temporarily hold the assembly component; and
at least one positioning guide configured to position a plurality of bolt through-holes in the assembly component to a plurality of screw holes in the target component, wherein
the jig body includes a plurality of tool insertion holes respectively corresponding to the plurality of bolt through-holes, and
the jig body has a tool guide groove extending so as to connect any two of openings of the plurality of tool insertion holes.

2. The component assembly jig according to claim 1, wherein
the jig body has a tool guide groove annularly extending so as to connect openings of the plurality of tool insertion holes to each other.

3. The component assembly jig according to claim 2, wherein
the tool guide groove is formed in a seamless manner.

4. A component assembly jig for assembling an assembly component to a target component using a plurality of bolts, the component assembly jig comprising:
a jig body configured to temporarily hold the assembly component; and
at least one positioning guide configured to position a plurality of bolt through-holes in the assembly component to a plurality of screw holes in the target component, wherein
in a state where the jig body temporarily holds the assembly component, there is formed a plurality of head part housing spaces that respectively houses head parts of the plurality of bolts inserted into the plurality of bolt through-holes in the assembly component between the assembly component and the jig body,
the jig body has jig-side bolt facing surfaces that face the head parts of the bolts housed in the head part housing spaces in a bolt insertion direction to restrict movement of the head parts in the bolt insertion direction,
the assembly component has component-side bolt facing surfaces that face the head parts of the bolts housed in the head part housing spaces in the bolt insertion direction to restrict the movement of the head parts in the bolt insertion direction, and
a distance between each jig-side bolt facing surface and the corresponding component-side bolt facing surface is longer than a dimension of the corresponding head part in the bolt insertion direction.

5. A component assembly jig for assembling an assembly component to a target component using a plurality of bolts, the component assembly jig comprising:
a jig body configured to temporarily hold the assembly component; and
at least one positioning guide configured to position a plurality of bolt through-holes in the assembly component to a plurality of screw holes in the target component, wherein
the at least one positioning guide includes a plurality of positioning guides, and
each positioning guide has a guide surface contactable with an outer peripheral surface of a cylindrical part of the target component in which a corresponding screw hole is formed.

* * * * *